United States Patent
Wang

(10) Patent No.: US 11,703,595 B2
(45) Date of Patent: Jul. 18, 2023

(54) IMAGE NOISE COMPENSATING SYSTEM, AND AUTO CLEAN MACHINE

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/724,459

(22) Filed: Apr. 19, 2022

(65) Prior Publication Data

US 2022/0244384 A1  Aug. 4, 2022

Related U.S. Application Data

(63) Continuation of application No. 16/654,022, filed on Oct. 16, 2019, now Pat. No. 11,340,352, which is a continuation-in-part of application No. 16/108,066, filed on Aug. 21, 2018, now Pat. No. 11,163,063, which is a continuation of application No. 14/864,809, filed on Sep. 24, 2015, now Pat. No. 10,088,568.

(30) Foreign Application Priority Data

Dec. 29, 2014  (TW) .................................. 103146094

(51) Int. Cl.
*G01S 7/4912* (2020.01)
*G01S 17/86* (2020.01)
*G06T 1/00* (2006.01)
*G01S 17/48* (2006.01)

(52) U.S. Cl.
CPC ............ *G01S 17/48* (2013.01); *G01S 7/4912* (2013.01); *G01S 17/86* (2020.01); *G06T 1/0014* (2013.01)

(58) Field of Classification Search
None
See application file for complete search history.

(56) References Cited

U.S. PATENT DOCUMENTS

| 2005/0111009 A1 | 5/2005 | Keightley |
| 2008/0159595 A1 | 7/2008 | Park |
| 2009/0262369 A1 | 10/2009 | Chuang |
| 2010/0045963 A1 | 2/2010 | Yamaguchi |

(Continued)

FOREIGN PATENT DOCUMENTS

| CN | 101561267 A | 10/2009 |
| CN | 101652628 A | 2/2010 |

(Continued)

*Primary Examiner* — Eric L Bolda
(74) *Attorney, Agent, or Firm* — Winston Hsu

(57) ABSTRACT

An image noise compensating system, comprising: a distance determining device, configured to determine whether a distance is larger than a distance threshold or not; an image sensor, comprising at least one image sensing unit, wherein the image sensor forms a combined image sensing unit when the distance is smaller than the distance threshold and senses images without forming the combined image sensing unit when the distance is larger than the distance threshold, wherein a width of an area that the combined image sensing unit can sense is larger than a width of an area that the image sensing unit can sense; a noise compensating circuit, configured to compensate image noises; and a control circuit, configured to calculate a location of the image noise compensating system.

14 Claims, 8 Drawing Sheets

Far
(D>DT)

Close
(D<DT)

(56) References Cited

U.S. PATENT DOCUMENTS

| | | |
|---|---|---|
| 2010/0277748 A1 | 11/2010 | Potapenko |
| 2012/0062868 A1 | 3/2012 | Kludas |
| 2012/0069320 A1 | 3/2012 | Simonov |
| 2013/0135605 A1 | 5/2013 | Wada |
| 2013/0141538 A1 | 6/2013 | DaneshPanah |
| 2013/0169595 A1 | 7/2013 | Chang |
| 2014/0016113 A1 | 1/2014 | Holt |
| 2014/0055575 A1 | 2/2014 | Imamura |
| 2015/0092018 A1* | 4/2015 | Kang ............... G01S 7/486 348/46 |
| 2015/0299992 A1 | 10/2015 | Shirai |
| 2016/0018526 A1 | 1/2016 | Van Den Bossche |
| 2016/0252619 A1 | 9/2016 | Markendorf |
| 2018/0073873 A1 | 3/2018 | Takao |

FOREIGN PATENT DOCUMENTS

| | | |
|---|---|---|
| CN | 101655350 A | 2/2010 |
| CN | 102356298 A | 2/2012 |
| CN | 102706319 A | 10/2012 |
| CN | 103116739 A | 5/2013 |
| CN | 103456007 A | 12/2013 |
| EP | 0 970 391 B1 | 12/2001 |
| TW | 201231935 | 8/2012 |
| TW | 201323832 | 6/2013 |
| TW | 201415415 | 4/2014 |
| TW | 201416644 | 5/2014 |

\* cited by examiner

Far
(D>DT)

Close
(D<DT)

Far
(D>DT)

Close
(D<DT)

IMAGE NOISE COMPENSATING SYSTEM, AND AUTO CLEAN MACHINE

CROSS REFERENCE TO RELATED APPLICATIONS

This application is a continuation application of U.S. application Ser. No. 16/654,022, filed on Oct. 16, 2019, which is a continuation-in-part of U.S. application Ser. No. 16/108,066, filed on Aug. 21, 2018, which is a continuation application of U.S. application Ser. No. 14/864,809, filed on Sep. 24, 2015. The contents of these applications are incorporated herein by reference.

BACKGROUND OF THE INVENTION

1. Field of the Invention

The present invention relates to an image noise compensating system and an auto clean machine, and particularly relates to an image noise compensating system and an auto clean machine which can increase an image noise compensating accuracy.

2. Description of the Prior Art

Conventionally, an auto clean machine such as an auto clean robot always captures images to calculate the location thereof. However, the captured images may have image noises, thus needed to be compensate or a location of the auto clean machine may not be correctly calculated.

FIG. 1 is a schematic diagram illustrating a conventional image noise compensating method. As illustrated in FIG. 1, an image Fa is first captured when a light source of the auto clean machine is turned on, and then an image Fb is captured when the light source is turned off. After that, the image Fb is subtracted from Fa such that the image noises in the image Fa can be compensated, since noises in the image Fb still exist when other features do not appear. However, the image signal generated by the light source, such as the image signal 100 illustrated in FIG. 1, may shift due to the movement of the auto clean machine. Therefore the image noises in the image Fa also shift. Such situation may decrease the noise compensating accuracy.

SUMMARY OF THE INVENTION

Therefore, one objective of the present invention is to provide a noise compensating system which can decrease necessary frame rate.

Another objective of the present invention is to provide an auto clean machine which can decrease necessary frame rate.

One embodiment of the present invention discloses an image noise compensating system, comprising: a distance determining device, configured to determine whether a distance between an object and an electronic device comprising the image noise compensating system is larger than a distance threshold or not; an image sensor, comprising at least one image sensing unit, wherein the image sensor forms a combined image sensing unit for sensing images when the distance is smaller than the distance threshold and senses images without forming the combined image sensing unit when the distance is larger than the distance threshold, wherein a width of an area that the combined image sensing unit can sense is larger than a width of an area that the image sensing unit can sense; a noise compensating circuit, configured to compensate image noises according to the images sensed by the image sensor; and a control circuit, configured to calculate a location of the image noise compensating system according to the images compensated by the noise compensating circuit.

Another embodiment of the present invention discloses an auto clean machine, comprising: a distance determining device, configured to determine whether a distance between an object and an electronic device comprising the auto clean machine is larger than a distance threshold or not; an image sensor, comprising at least one image sensing unit, wherein the image sensor forms a combined image sensing unit for sensing images when the distance is smaller than the distance threshold and senses images without forming the combined image sensing unit when the distance is larger than the distance threshold, wherein a width of an area that the combined image sensing unit can sense is larger than a width of an area that the image sensing unit can sense; a noise compensating circuit, configured to compensate image noises according to the images sensed by the image sensor; and a control circuit, configured to calculate a location of the auto clean machine according to the images compensated by the noise compensating circuit.

In view of above-mentioned embodiments, a pixel with a larger size can be used when the auto clean machine is closer to the object, to reduce the necessary frame rate. Also, a pixel with a smaller size can be used when the auto clean machine is far from the object, to maintain the image resolution.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, each component or each step in followings embodiments can be implemented by hardware such as a circuit or a device, or implemented by firmware such as a processor installed with at least one program. Also, the components in each embodiment can be integrated to fewer components or be divided to more components.

Figure 1:
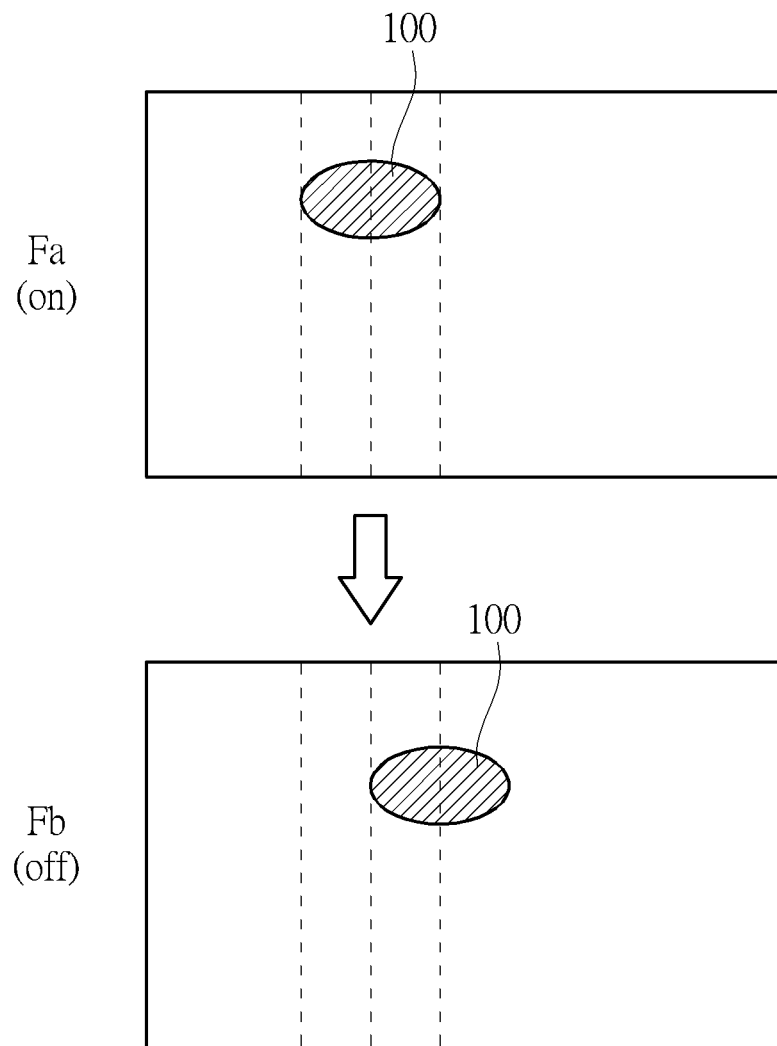
FIG. 1 is a schematic diagram illustrating a conventional image noise compensating method.
Figure 2:
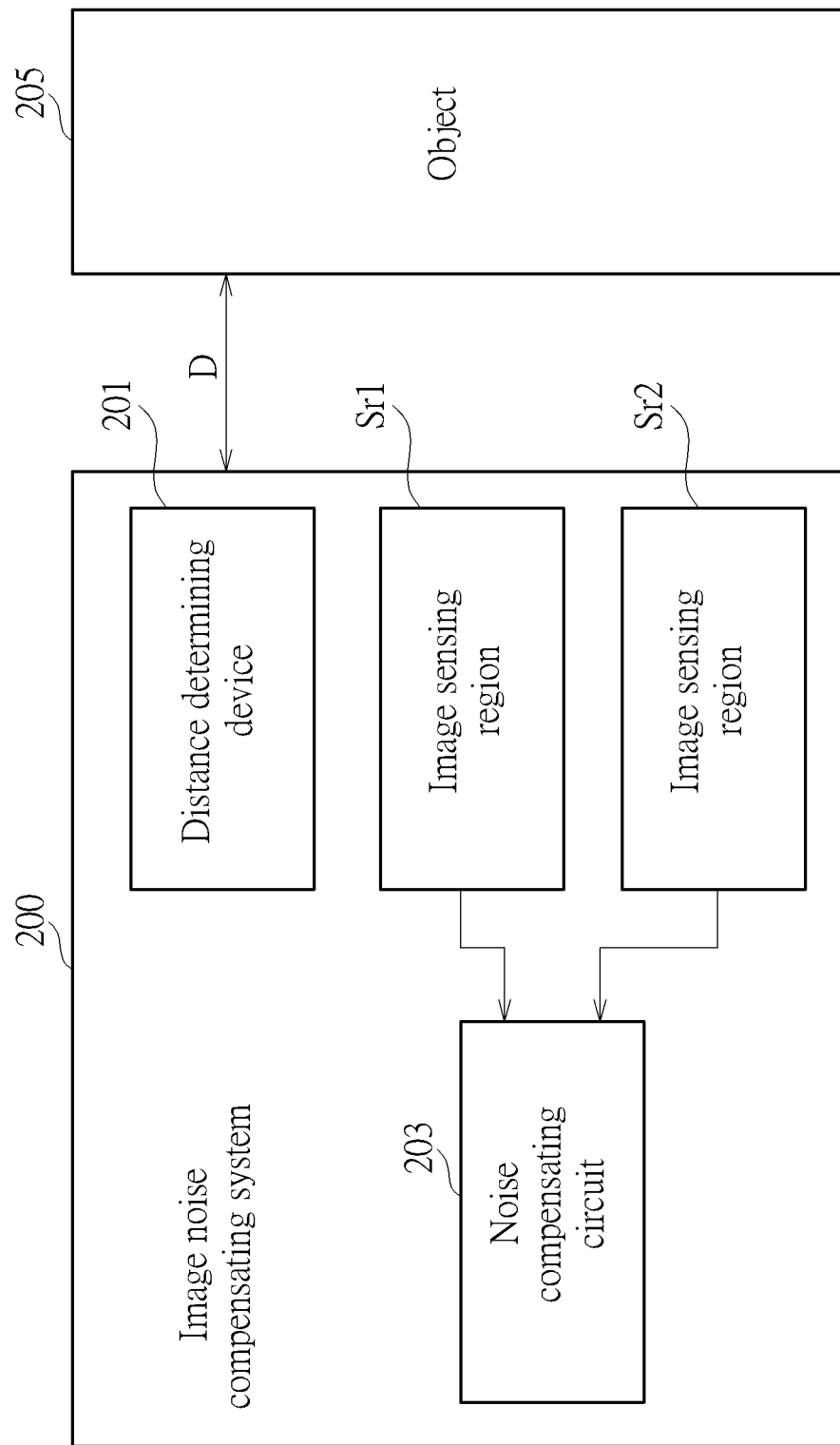
FIG. 2 is a block diagram illustrating an image noise compensating system according to one embodiment of the present invention.

FIG. 2 is a block diagram illustrating an image noise compensating system according to one embodiment of the present invention. As illustrated in FIG. 2, the image noise compensating system 200 comprises a distance determining device 201, a noise compensating circuit 203, a first image sensing region Sr1 and a second image sensing region Sr2. The distance determining device 201 is configured to determine whether a distance D between an object 205 (e.g. a wall or a furniture) and an electronic device comprising the image noise compensating system 200 is larger than a distance threshold DT or not. For example, if the distance determining device 201 is provided in an auto clean machine, the distance determining device 201 is configured to determine whether a distance D between the object 205 and the auto clean machine is larger than a distance threshold DT or not. Please note the electronic device here can also mean the image noise compensating system 200 itself. In following embodiments, the electronic device comprising the image noise compensating system 200 is an auto clean machine.

The first image sensing region Sr1 comprises at least one first image sensing unit, and the second image sensing region Sr2 comprises at least one second image sensing unit. A size of the first image sensing unit is larger than a size of the second image sensing unit. In one embodiment, the first image sensing unit and the second image sensing unit are pixels. The noise compensating circuit 203 is configured to compensate image noises of images captured by the first image sensing region Sr1 or the second image sensing region Sr2. Specifically, the noise compensating circuit 203 uses images sensed by the first image sensing region Sr1 to compensate the image noises when the distance D is smaller than the distance threshold DT, and uses images sensed by the second image sensing region Sr2 to compensate the image noises when the distance D is larger than the distance threshold DT. The noise compensating circuit 203 can use the method illustrated in prior art to compensate image noises, but can use other compensate methods.

It will be appreciated the image noise mentioned here can mean fixed and undesired pattern in the images, the image noises caused by the image sensing algorithms, or any undesired features.

In one embodiment, the first image sensing region Sr1 is activated but the second image sensing region Sr2 is not activated when the distance D is smaller than the distance threshold DT, and the first image sensing region Sr1 is not activated but the second image sensing region Sr2 is activated when the distance D is larger than the distance threshold DT. In one embodiment, the first image sensing region Sr1 and the second image sensing region Sr2 are provided in two physically independent image sensors. In another embodiment, the first image sensing region Sr1 and the second image sensing region Sr2 are provided in a single image sensor.

Figure 3:
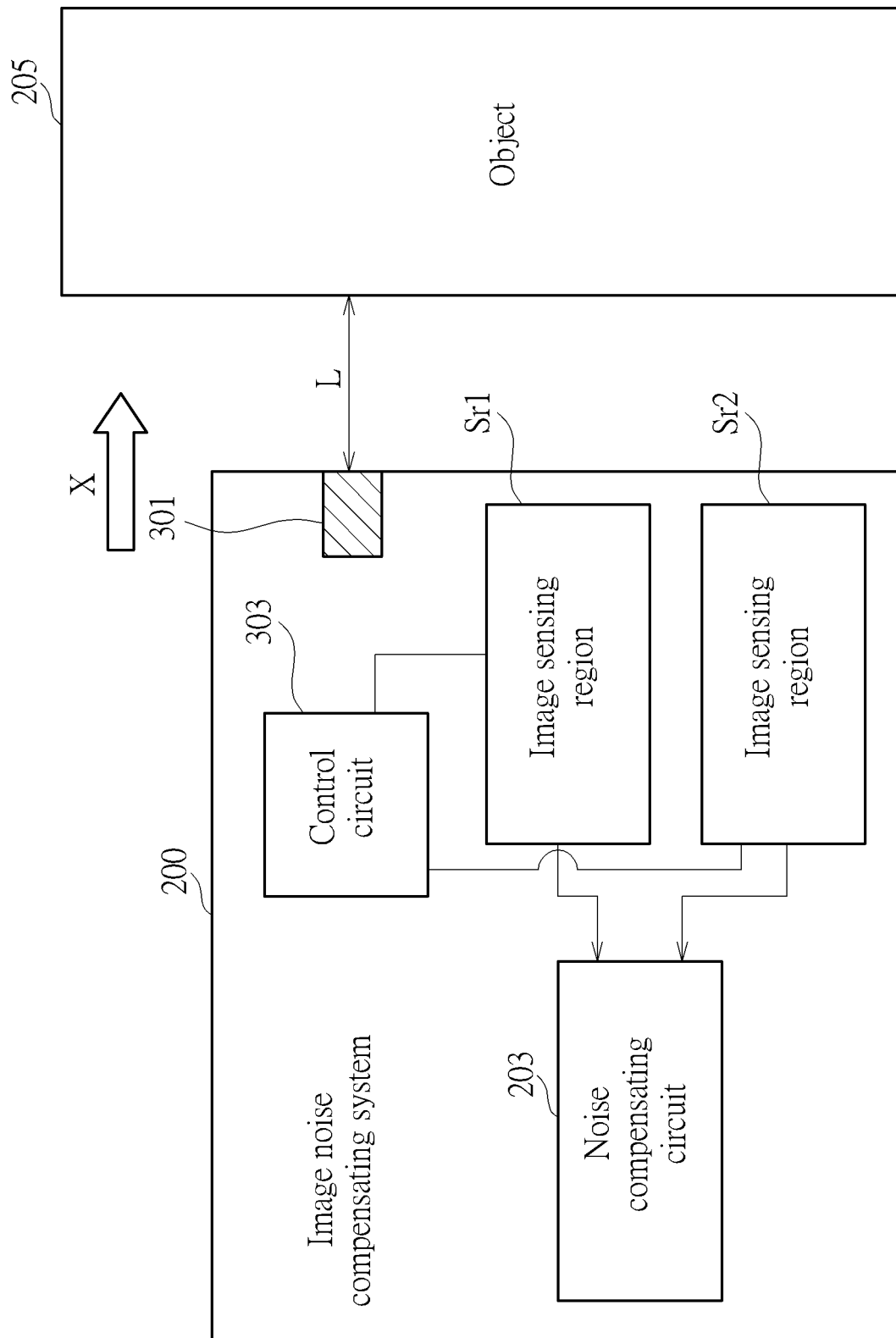
FIG. 3 is a more detail block diagram of the image noise compensating system illustrated in FIG. 2 according to one embodiment of the present invention.

FIG. 3 is a more detail block diagram of the image noise compensating system 200 in FIG. 2 according to one embodiment of the present invention. In this embodiment, the image noise compensating system 200 comprises the noise compensating circuit 203, the first image sensing region Sr1 and the second image sensing region Sr2 illustrated in FIG. 2, and further comprises a light source 301 and a control circuit 303. In such case, the distance determining device 201 comprises the light source 301, the first image sensing region Sr1 or the second image sensing region Sr2, and the control circuit 303. The control circuit 303 determines whether the distance D is larger than the distance threshold DT or not according at least one image which is generated according to light L from the light source 301 and sensed by one of the first image sensing region Sr1 and the second image sensing region Sr2. If the image noise compensating system 200 is provided in an auto clean machine, the control circuit 303 can be a processor configured to control the auto clean machine. Besides, in one embodiment, the noise compensating circuit 203 is integrated to the control circuit 303. Also, if the image noise compensating system 200 is provided in an auto clean machine, the control circuit 303 can further calculate a location of the auto clean machine according to images compensated by the noise compensating circuit 203.

Figure 4:
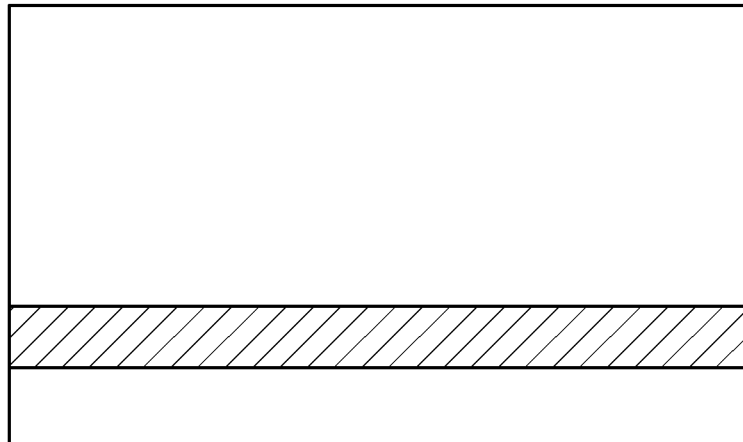
FIG. 4 is a schematic diagram illustrating how to determine the distance based on a shape of light, according to one embodiment of the present invention.
Figure 4:
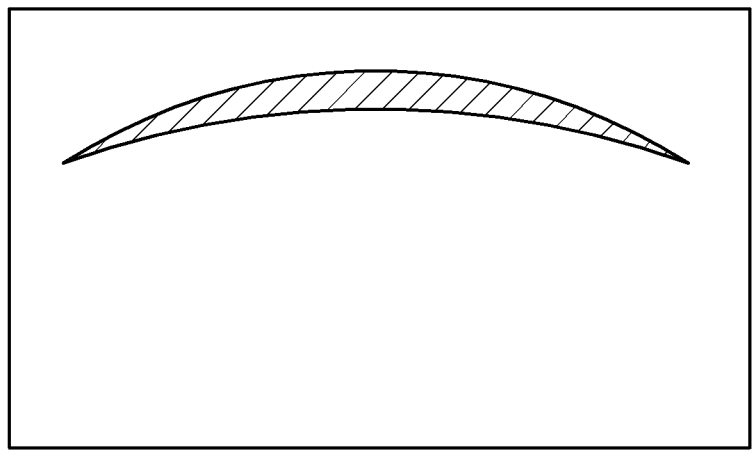

In one embodiment, the light source 301 is a line light source, and the control circuit 303 determines whether the distance D is larger than the distance threshold DT or not according a shape formed by the light L. The shape formed by the light L can be acquired based the images sensed by the first image sensing region Sr1 or the second image sensing region Sr2. FIG. 4 is a schematic diagram illustrating how to determine the distance according a shape of light L, according to one embodiment of the present invention. FIG. 4 is a schematic diagram of FIG. 3 viewed in the X direction. As illustrated in FIG. 4, if the image noise compensating system 200 is far from (i.e. D>DT) the object 205 but the light L can reach the object 205, the light L forms a line shape on the object 205. On the opposite, if the image noise compensating system 200 is close to (i.e. D<DT) the object 205, the light L forms a curve shape on the object 205. By this way, the control circuit 303 can determine whether the distance D is larger than the distance threshold DT or not according a shape formed by the light L.

However, the light source 301 is not limited to a line light source and relations between locations the light source 301, the first image sensing region Sr1 and the second image sensing region Sr2 are not limited to the embodiment illustrated in FIG. 3. For example, in the embodiment of FIG. 3, a location of the light source 301 is above the first image sensing region Sr1 and the second image sensing region Sr2. However, in another embodiment, a location of the light source 301 is below the first image sensing region Sr1 and the second image sensing region Sr2. Therefore, the operations of determining whether the distance D is larger than the distance threshold DT or not according a shape formed by the light L are not limited to the embodiment illustrated in FIG. 4. However, the distance determining device 201 can apply other methods to determine the distance D, such as laser, rather than being limited to the embodiment illustrated in FIG. 3.

Figure 5:
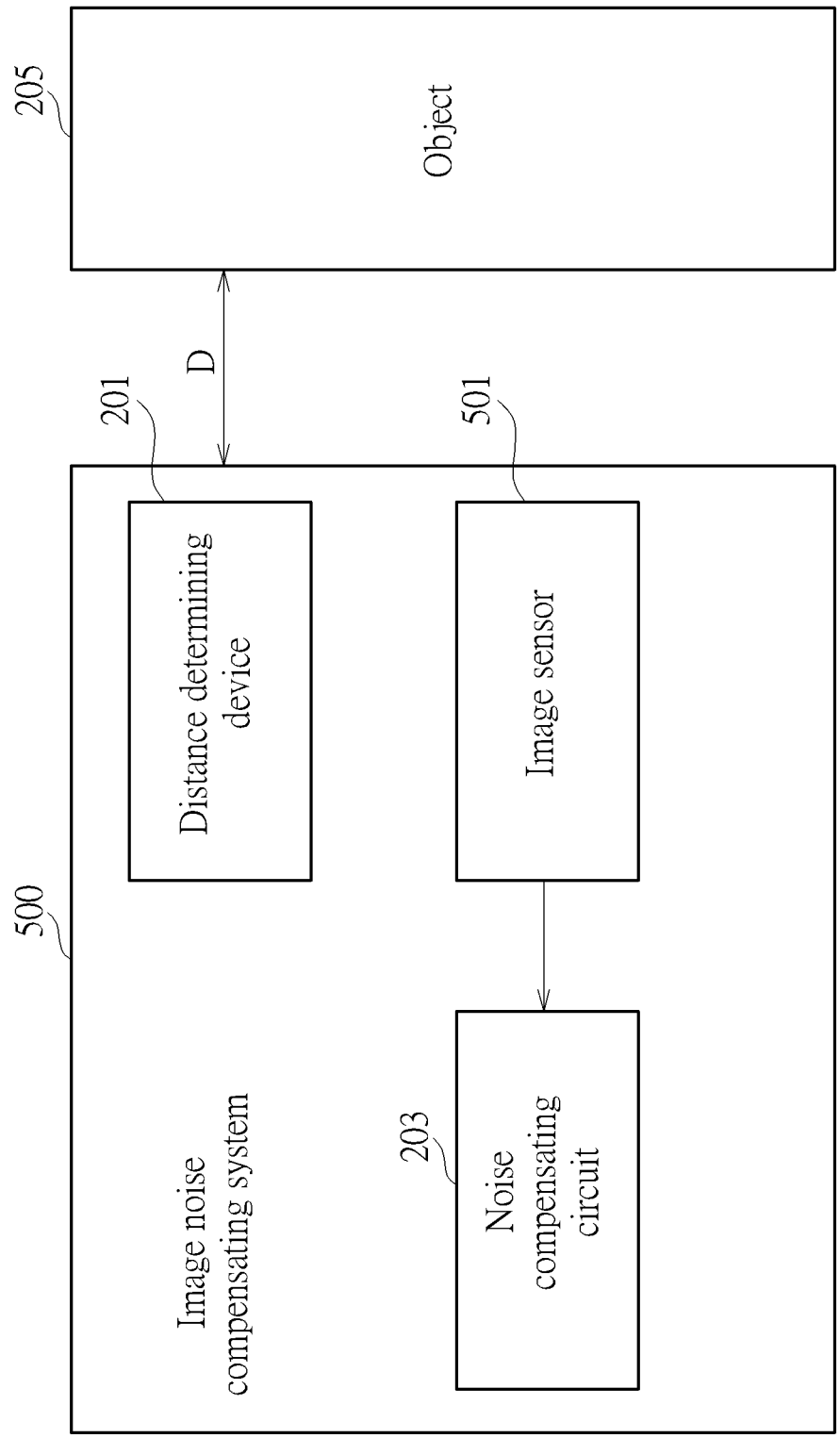
FIG. 5 is a block diagram illustrating an image noise compensating system according to another embodiment of the present invention.

FIG. 5 is a block diagram illustrating an image noise compensating system according to another embodiment of the present invention. Comparing with the image noise compensating system 200 in FIG. 2, the image noise compensating system 500 also comprises the distance determining device 201 and the noise compensating circuit 203. However, the first image sensing region Sr1 and the second image sensing region Sr2 in FIG. 2 are replaced by an image sensor 501 in the embodiment of FIG. 5. The image sensor 501 comprises at least one image sensing unit. The image sensor 501 combines a plurality of image sensing units to sense images when the distance D is smaller than the distance threshold DT. That is, the image sensor 501 uses the sensed data a plurality of image sensing units as sensed data of a single image sensing unit. Also, the image sensor 501 senses images without combining the image sensing units when the distance D is larger than the distance threshold DT.

The noise compensating circuit 203 compensates image noises according to the images sensed by the image sensor 501.

Figure 6:
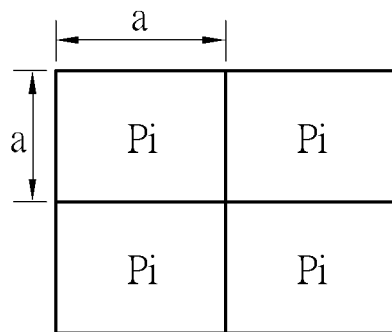
FIG. 6 is a schematic diagram illustrating operations of the image sensor illustrated in FIG. 5 according to one embodiment of the present invention.
Figure 6:
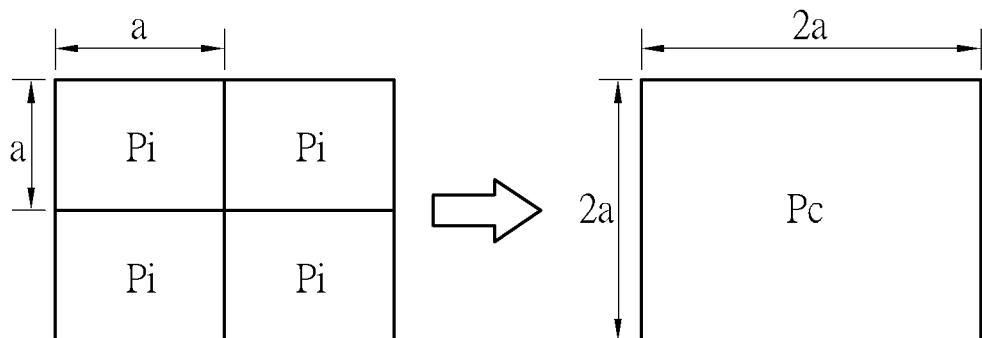

FIG. 6 is a schematic diagram illustrating operations of the image noise compensating system illustrated in FIG. 5 according to one embodiment of the present invention. As illustrated in FIG. 6, the image sensor 501 comprises a plurality of pixels Pi served as the image sensing units, and each pixel Pi has a size a*a. The image sensor 501 uses the pixels Pi to sense images when the auto clean machine is far from the object 205 (i.e. the distance D is larger than the distance threshold DT.). On the contrary, the image sensor 501 combines a plurality of pixels Pi (in this embodiment, 4 pixels Pi) to form a 2a*2a combined pixel Pc to sense images when the electronic device comprising the image noise compensating system 500 is close the object 205 (i.e. the distance D is smaller than the distance threshold DT.). In one embodiment, the image sensor 501 uses a pixel binning method to combine a plurality of pixels Pi. The contents disclosed in the embodiments of FIG. 2 and FIG. 3 can also be applied to the embodiment in FIG. 5. Descriptions thereof are omitted for brevity here.

Figure 7:
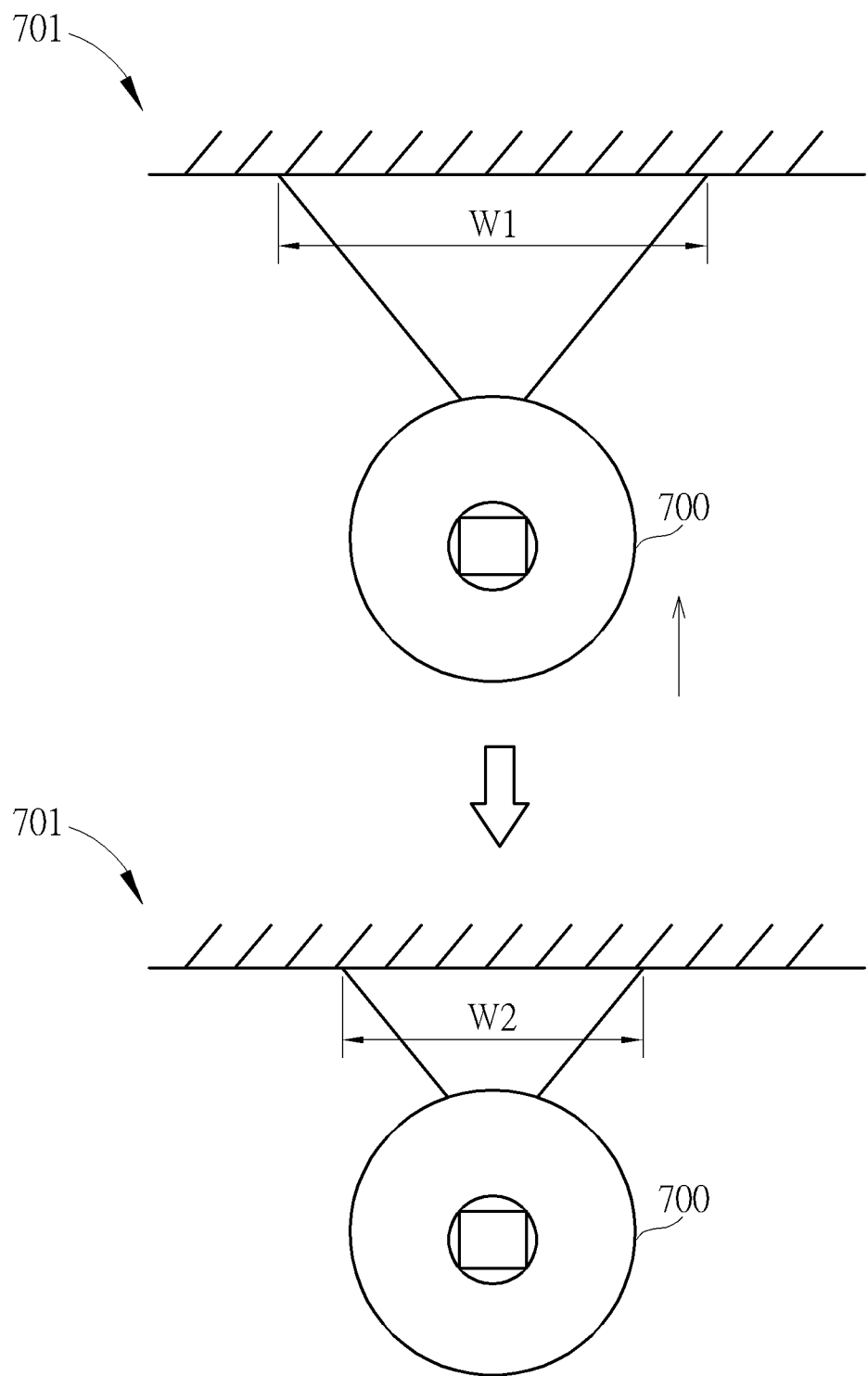
FIG. 7 and FIG. 8 are schematic diagrams illustrating advantages which the present invention can provide.
Figure 8:
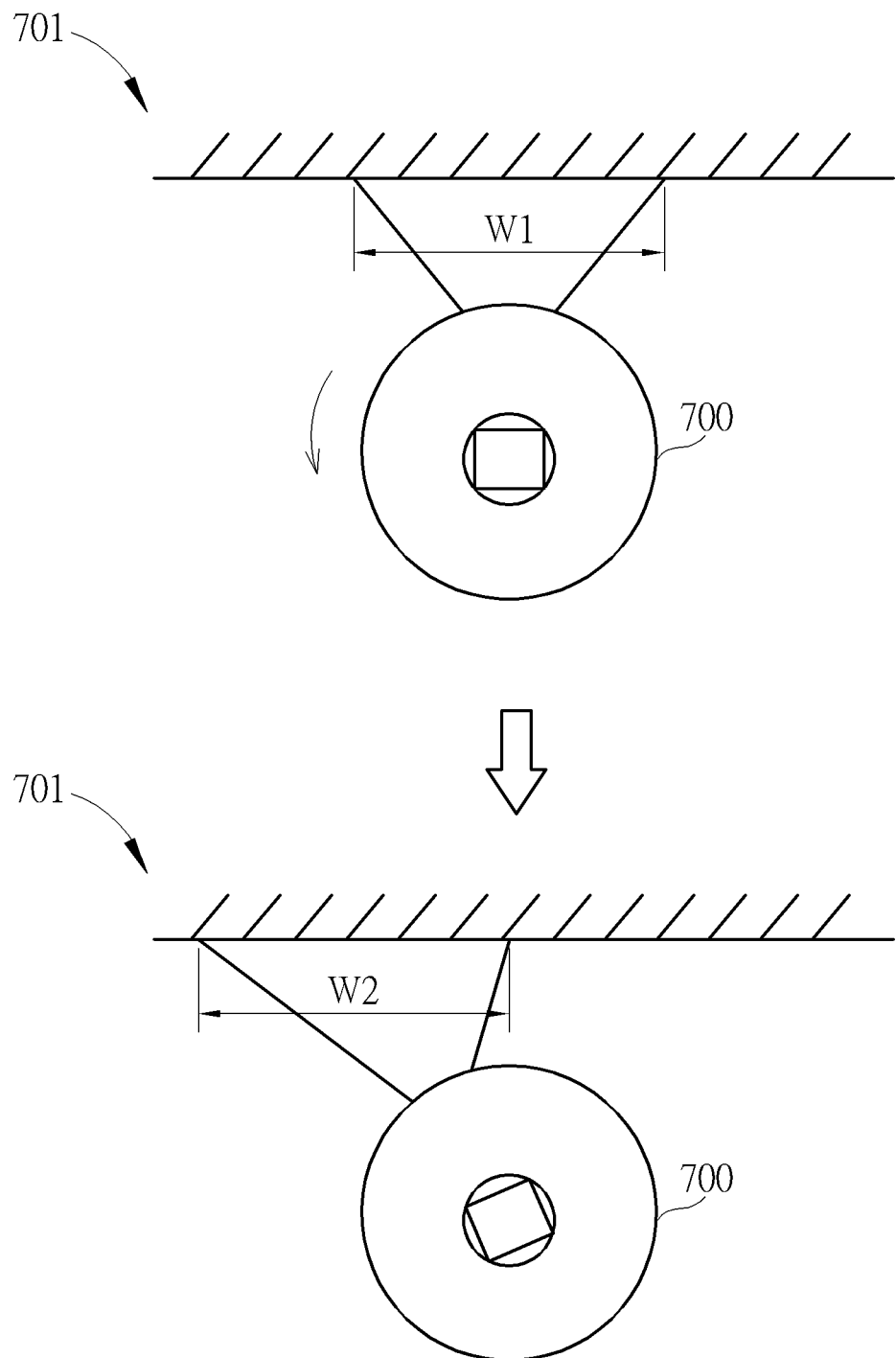

FIG. 7 and FIG. 8 are schematic diagrams illustrating advantages which the present invention can provide, when the noise compensating systems are applied to an auto clean machine. In FIG. 7, widths w1 and w2 respectively mean a width of an area which a pixel of an image sensor in the auto clean machine 700 can sense. Also, the auto clean machine is approaching the object 701, which is a wall, in the example of FIG. 7. Accordingly, the auto clean machine 700 is closer to the object 701 in the below drawing than in the upper drawing, thus the width w1 is larger than the width w2. Therefore, the image noises of images captured by the image sensor in the auto clean machine 700 may shift, since there is difference between the widths d1 and d2. Accordingly, the frame rate of the image sensor in the auto clean machine 700 must be high enough to avoid such issue. However, a higher frame rate causes more power consumption, and a maximum value of the frame rate is always limited. Such issue becomes more serious when the auto clean machine 700 is close to the object 701.

The area which a pixel can cover is proportional to a pixel size. Accordingly, the widths of areas can also increase when a pixel size increases. If the width of the area that the pixel can sense increases, the displacement of the image noise becomes a smaller ratio than the width. Therefore, the necessary frame rate can be reduced if the pixel size is enlarged.

FIG. 8 is a schematic diagram illustrating advantages which the present invention can provide according to another embodiment of the present invention. In the example of FIG. 8, the auto clean machine 700 rotates in a counter clock wise manner. Therefore, the widths w1, w2 may have differences or the locations thereof may have difference. Therefore, the image noises of images captured by the image sensor in the auto clean machine 700 may shift. As above-mentioned, a size of the area which a pixel can sense is proportional to a pixel size. Accordingly, the widths of areas can also increase when the pixel size increases. If the width of the area that the pixel can sense increases, the displacement of the image noise becomes a smaller ratio than the width. Therefore, the necessary frame rate can be reduced if the pixel size is enlarged.

In view of above-mentioned embodiments, a pixel with a larger size can be used when the auto clean machine is closer to the object, to reduce the necessary frame rate. Also, a pixel with a smaller size can be used when the auto clean machine is far from the object, to maintain the image resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image noise compensating system, comprising:
    a distance determining device, configured to determine whether a distance between an object and an electronic device comprising the image noise compensating system is larger than a distance threshold or not;
    an image sensor, comprising at least one image sensing unit, wherein the image sensor forms a combined image sensing unit for sensing images when the distance is smaller than the distance threshold and senses images without forming the combined image sensing unit when the distance is larger than the distance threshold, wherein a width of an area that the combined image sensing unit can sense is larger than a width of an area that the image sensing unit can sense;
    a noise compensating circuit, configured to compensate image noises according to the images sensed by the image sensor; and
    a control circuit, configured to calculate a location of the image noise compensating system according to the images compensated by the noise compensating circuit.

2. The image noise compensating system of claim 1, wherein the image sensing units are pixels.

3. The image noise compensating system of claim 1, wherein the distance determining device comprises a light source, the image sensor, and the control circuit, wherein the control circuit determines whether the distance is larger than the distance threshold or not according at least one image which is generated according to light from the light source and sensed by the image sensor.

4. The image noise compensating system of claim 3, wherein the light source is a line light source, wherein the control circuit determines whether the distance is larger than the distance threshold or not according a shape formed by the light.

5. The image noise compensating system of claim 4, wherein the light source is above the image sensor.

6. The image noise compensating system of claim 4, wherein the light source is below the image sensor.

7. The image noise compensating system of claim 1, wherein the image sensor forms the combined image sensing unit by a pixel binning method.

8. An auto clean machine, comprising:
    a distance determining device, configured to determine whether a distance between an object and an electronic device comprising the auto clean machine is larger than a distance threshold or not;
    an image sensor, comprising at least one image sensing unit, wherein the image sensor forms a combined image sensing unit for sensing images when the distance is smaller than the distance threshold and senses images without forming the combined image sensing unit when the distance is larger than the distance threshold, wherein a width of an area that the combined image sensing unit can sense is larger than a width of an area that the image sensing unit can sense;

a noise compensating circuit, configured to compensate image noises according to the images sensed by the image sensor; and a control circuit, configured to calculate a location of the auto clean machine according to the images compensated by the noise compensating circuit.

9. The auto clean machine of claim 8, wherein the image sensing units are pixels.

10. The auto clean machine of claim 8, wherein the distance determining device comprises a light source, the image sensor, and the control circuit, wherein the control circuit determines whether the distance is larger than the distance threshold or not according at least one image which is generated according to light from the light source and sensed by the image sensor.

11. The auto clean machine of claim 10, wherein the light source is a line light source, wherein the control circuit determines whether the distance is larger than the distance threshold or not according a shape formed by the light.

12. The auto clean machine of claim 11, wherein the light source is above the image sensor.

13. The auto clean machine of claim 11, wherein the light source is below the image sensor.

14. The auto clean machine of claim 8, wherein the image sensor forms the combined image sensing unit by a pixel binning method.

* * * * *